United States Patent [19]

Chalupa et al.

[11] Patent Number: 5,372,829
[45] Date of Patent: Dec. 13, 1994

[54] PROCESS FOR PREPARING LOW-FAT FRIED FOOD

[75] Inventors: William F. Chalupa, Aurora, Ill.; George R. Sanderson, Carlsbad, Calif.

[73] Assignee: Merck & Co., Inc., Rahway, N.J.

[21] Appl. No.: 6,027

[22] Filed: Jan. 15, 1993

[51] Int. Cl.⁵ .............................................. A23L 1/054
[52] U.S. Cl. .................... 426/293; 426/296; 426/302; 426/438
[58] Field of Search ................. 426/92, 94, 102, 293, 426/296, 302, 438, 441, 573, 637, 641, 615

[56] References Cited

U.S. PATENT DOCUMENTS

| | | |
|---|---|---|
| 3,255,021 | 6/1966 | Earle et al. . |
| 3,395,024 | 7/1968 | Earle et al. . |
| 3,397,993 | 8/1968 | Strong . |
| 3,424,591 | 1/1969 | Gold . |
| 3,653,924 | 4/1972 | Penton ............................ 426/637 X |
| 3,676,158 | 7/1972 | Fischer et al. . |
| 3,865,962 | 2/1975 | Earle .............................. 426/291 |
| 4,000,324 | 12/1976 | Horn ................................ 426/103 |
| 4,260,637 | 4/1981 | Rispoli et al. ................... 426/293 X |
| 4,504,502 | 3/1985 | Earle et al. ..................... 426/293 |
| 4,511,583 | 4/1985 | Olson et al. ...................... 426/89 |
| 4,647,470 | 3/1987 | Sanderson et al. ............... 426/573 |
| 4,869,916 | 9/1989 | Clark et al. ..................... 426/573 |
| 4,900,573 | 2/1990 | Meyers et al. ................... 426/302 |
| 4,917,908 | 4/1990 | Prosise ........................... 426/102 |

FOREIGN PATENT DOCUMENTS

| | | |
|---|---|---|
| 1079628 | 8/1967 | European Pat. Off. . |
| 0487340A1 | 5/1992 | European Pat. Off. . |

*Primary Examiner*—Arthur L. Corbin
*Attorney, Agent, or Firm*—Richard S. Parr; Melvin Winokur; Paul D. Matukaitis

[57] ABSTRACT

The present invention is a procedure for preparing cooked foods which involve the use of a gellan gum batter to coat a food substrate to impart qualities which are typically associated with fried foods, including crispness and juiciness. The coated food is then fried and frozen. Food products resulting from the procedure of the present invention contain low levels of fat and yet have the desirable qualities of fried foods.

3 Claims, No Drawings

PROCESS FOR PREPARING LOW-FAT FRIED FOOD

BACKGROUND OF THE INVENTION

The invention relates to a process for preparing low-fat fried food or low-fat fried type food.

It is well known to form a film around food products such as seafood, meat, poultry, vegetables, cheese and dough products for effective results with respect to shelf life and product integrity. Earle et al., U.S. Pat. No. 3,255,021 and Earle U.S. Pat. No. 3,395,024 exemplify the prior art process of using two solutions to form an alginate film which will hold and bind products together and encapsulate same, thereby retarding oxidation, rancidity, dehydration and moisture migration.

Earle et al., U.S. Pat. No. 4,504,502 describes a food product made by applying an aqueous dispersion containing water soluble algin to the surface of a food substrate, and applying a dry gelling mixture to the algin-coated food substrate for a period of time sufficient to form a substantially continuous edible film along the surface of the food product.

Gerrish et al., European Publication 487,340, describe a procedure for frying potatoes, chicken, egg rolls, and dough which requires precoating the food with low molecular weight pectin, methylcellulose, and alginate hydrocolloids.

SUMMARY OF THE INVENTION

According to the present invention, low-fat fried food or low-fat "fried type" food is prepared according to a procedure which involves coating the food substrate with the high molecular weight hydrocolloid gellan gum. The coated food is then cooked by frying, conventional oven cooking, or microwave cooking.

Generally, the present invention is a procedure for preparing cooked foods which involved the use of gellan gum to impart food qualities which are typically associated with fried foods, including crispness and juiciness. Food products resulting from the procedure of the present invention contain low levels of fat and yet have the desirable qualities of fried foods.

DETAILED DESCRIPTION OF THE INVENTION

Unless otherwise indicated, terminology used to describe the process should be understood to have their usual meaning as understood by those skilled in the art.

"Heated" or "Heating" refers to a process of temperature elevation of a food substrate which may or may not rapidly and irreversibly substantially modify the molecular conformation of the food substrate.

"Cooked" or "Cooking" refers a process for rapidly and irreversibly substantially modifying the molecular conformation of a food substrate by temperature elevation.

"Fried" or "Frying" refers to a cooking process whereby the temperature of the food substrate is elevated in the presence of a fat or fatty acid substance, including butter and various oils, whereby the fat or fatty acid substances are incorporated into the food substrate.

"Blanched" or "Blanching" refers to a process of exposing a food substrate to heating conditions which modify the food substrate surface but do not cook or irreversibly substantially modify the overall molecular conformation of the food substrate.

"Dried" or "Drying" refers to a procedure whereby the temperature of the food substrate is elevated in order to evaporate excessive moisture on the surface of the food substrate, but not to irreversibly substantially modify the overall molecular conformation of the food substrate.

"Baked" or "Baking" refers to a process of temperature elevation of a food substrate resulting in a dried, hardened food product.

Generally, the present invention is a procedure for preparing cooked foods which involved the use of gellan gum to impart food qualities which are typically associated with fried foods, including crispness and juiciness. Food products resulting from the procedure of the present invention contain low levels of fat and yet have the desirable qualities of fried foods.

In one embodiment, the procedure includes coating the food substrate with a mixture containing gellan gum, and subsequently frying, cooking, or drying the food substrate. The coatings reduce oil pick-up and may be applied by spraying or dipping. For example, a hot solution containing gellan gum can be sprayed or dipped onto the food substrate and allowed to cool. Alternatively, the food substrate can be dipped into a cold solution of gellan gum and gelation and film formation brought about by allowing the ions to diffuse into solution.

Ions increase the strength of the film and, although not always required, can be included in the hot solution or, as previously mentioned, introduced by diffusion from an external source or from the food itself. Gellan gum has the ability to gel with sodium ions from common table salt. Coating solutions containing gellan gum can also include sodium citrate, sodium acid pyrophosphate, or sodium bicarbonate. Other ions that can be used include calcium (e.g. from calcium gluconate, calcium lactate or calcium chloride), magnesium, potassium, and hydrogen (acid). A particular advantage of this ion-induced gelation is that the films can be formulated to be heat stable.

Coating solutions may also contain dextrose, wheat flour, corn flour, vegetable oil, and milk or milk solids are preferably non-fat. Egg whites are preferably dried powder egg whites. If starches are used in the batter formulation, high amylose starch is preferred. Flavorings such as onion powder, garlic powder, paprika, black pepper, ground rosemary, ground thyme, white pepper, sage, yeast extract, smoke, barbecue and cheese flavors may be used as well as other flavorings and colorings.

For breaded products (using dry bread material such as leavened bread crumbs, wheat crumbs, corn crumbs, and Japanese Style bread crumbs, preferably Japanese Style bread crumbs, having #8 mesh particle size) an aqueous solution of gellan gum can be applied to the outside by spraying or dipping to form a gelled film. The coated product can then be partially baked and frozen, or simply frozen raw eliminating the need for frying altogether. During reconstitution, the products can be heated in an oven or microwave and have the appearance of a deep-fat fried product.

Optionally, if the aqueous gellan gum solution contains added mono- or divalent ions such as sodium or calcium, an instantaneous "snap" setting gel can be obtained which is extremely heat stable. The product containing these gels, if fried, will be crispier and have reduced oil absorption.

As an alternative to spraying or dipping to coat breaded products with a solution of gellan gum, the bread crumbs themselves can be coated with the solution in a fluidized bed air dryer to produce a free flowing crumb. This crumb can be used in place of a conventional crumb or to enhance crispness and reduce oil absorption of fried foods.

Another alternative method for preparing a free flowing crumb with reduced oil absorption is to formulate gellan gum directly into the dough mix itself which is then proofed, baked and ground into a crumb.

In a preferred embodiment, the invention is a process for preparing a low-fat fried food comprising:
a) mixing water, flour, dextrose, non fat milk solids, sodium salt, calcium salt, and gellan gum, preferably between 0.05 and 1.0% gellan gum, to form a gellan gum batter;
b) coating a food substrate with the gellan gum batter, and optionally breading the coated food substrate;
c) frying or partially frying the coated food substrate;
d) freezing the product of (c); and
e) cooking the frozen product.

In another preferred embodiment, the invention is a process for preparing a low-fat fried-type food comprising:
a) mixing water, flour, dextrose, non fat milk solids, sodium salt, calcium salt, and gellan gum, preferably between 0.05 and 1.0% gellan gum, to form a gellan gum batter;
b) coating a food substrate with the gellan gum batter, and optionally breading the coated food substrate;
c) freezing the product of (b); and
d) cooking the frozen product.

In another preferred embodiment, the invention is a process for preparing a low-fat fried-type food comprising:
a) heating a mixture of water, vegetable oil, gellan gum, xanthan gum, and flavoring, preferably wherein the amount of gellan gum in the mixture is between about 0.1 and 1.0%, the amount of xanthan gum in the mixture is between about 0.05 and 0.5%, and the amount of vegetable oil is between about 12 and 25%, and preferably wherein the heating temperature is between about 70° C. and 110° C.;
b) adding sodium salt to the heated mixture;
c) boiling the salt-containing mixture;
d) blanching a food substrate in the boiling mixture; and
e) heating the blanched food substrate, preferably drying or cooking the blanched food substrate, in a conventional oven or cooking. Thereafter, the heated blanched food substrate is optionally frozen and reconstituted by cooking in a conventional oven or a microwave oven.

In another preferred embodiment, the invention is a process for preparing a low-fat baked dough food comprising:
a) mixing water, flour, dextrose, sodium salt and gellan gum to form a gellan gum/flour mix, preferably wherein the amount of gellan gum in the gellan gum/flour mix is between about 0.05 and 1.0%;
b) adding a mixture of yeast and water to the gellan gum/flour mix to form a gellan gum/flour/yeast dough; and
c) baking the dough.

In another preferred embodiment, the invention is a process for preparing a low-fat coated baked dough food comprising:
a) mixing water, gellan gum, calcium salt and sodium salt to form a gellan gum solution preferably wherein the amount of gellan gum in gellan gum solution is between about 0.05 and 1.0%;
b) spraying the solution onto a baked dough food to form a coated baked dough food; and
c) drying the coated baked dough food optionally in a conventional oven or fluidized bed drier.

In another preferred embodiment, the invention is a process for preparing a low-fat fried type food comprising:
a) mixing water, flour, dextrose, non fat milk solids, sodium salt, starch, xanthan gum and gellan gum to form a gellan gum/xanthan gum batter preferably wherein the amount of gellan gum in the batter is between about 0.05 and 1.0% and the amount of xanthan gum in the batter is between about 0.05 and 1.0%;
b) coating a food substrate with the batter; and
c) baking the coated food substrate in a conventional oven.

Food substrates

Food substrates include, for example, seafood, meat, poultry, vegetable, e.g. onions, potatoes, green peppers, zucchini, and squash, fruits, combinations or dough-enrobed products. The dough products may include pizza, burritos, tortillas, egg rolls, pie crust and the like.

Typically, the procedure of the invention is used to prepare chicken, fish, cheese, vegetables, potatoes, and dough-enrobed items such as egg rolls and pizza rolls.

Xanthan gum is an extracellularly produced gum made by the heteropolysaccharide-producing bacterium *Xanthomonas campestris* by whole culture fermentation of medium comprising a fermentable carbohydrate, a nitrogen source and other appropriate nutrients. Examples of commercially available xanthan gum are KELTROL® T, KELTROL® F, KELTROL® GM, KELZAN® AR and KELZAN®, available from Kelco Division of Merck & Co., Inc. Processes for producing xanthan gum are described in a number of patents including U.S. Pat. Nos. 4,316,012, 4,352,882 and 4,375,512.

Gellan gum is a heteropolysaccharide prepared by fermentation of *Pseudomonas elodea* ATCC 31461. An example of commercially available gellan gum is KELCOGEL®, available from Kelco Division of Merck & Co., Inc. Processes for preparing gellan gum include those described in U.S. Pat. Nos. 4,326,052 and 4,326,053.

The process of the present invention may be effected using standard batter and breading machines and other existing equipment to achieve the desired results of the process.

EXAMPLE 1

Low-Fat, Ovenable/Microwaveable French Fries Using KELCOGEL Gellan Gum and KELTROL GM Xanthan Gum This formula uses KELCOGEL and KELTROL GM to evenly coat and distribute a thin film of oil on French fries. Raw potatoes are not fried, but blanched and then baked in a convection-type oven and frozen. Upon reconstitution in a microwave or convention oven a crisp product is obtained which has a fat content of 5% or less.

| INGREDIENTS | GRAMS | PERCENT |
| --- | --- | --- |
| Water | 468.50 | 93.70 |
| Vegetable oil | 23.50 | 4.70 |
| Fried flavor (OM ingredients) | 2.50 | 0.50 |
| KELCOGEL gellan gum | 2.50 | 0.50 |
| Salt | 2.00 | 0.40 |
| KELTROL GM xanthan gum | 0.50 | 0.10 |
| Sodium citrate dehydrate, fine granular | 0.50 | 0.10 |
| (H & R) | 500.00 g | 100.00% |
| Potatoes, freshly peeled and cut into French fries | 200.00 | .00 |

Procedure

1. Add water, vegetable oil and sodium citrate to a 1 liter container.
2. Dry blend KELCOGEL, KELTROL GM and fried flavor. Add to a liquid mixture and mix using high shear mixer.
3. Heat mixture to 190° F. (88° C.) under constant agitation.
4. Dissolve salt in small amount of water and slowly add to hot mixture.
5. Transfer hot solution to another container and bring to a boil. Add cut potatoes to solution and blanch for 2 minutes.
6. Remove blanched potatoes and dry in convection oven @ 375° F. (191° C.) for 10 minutes, or until golden brown.
7. Remove French fries from oven and place in freezer.
8. French fries can be reconstituted in convention oven @ 350° F. (177° C.) for 5–7 minutes, or microwaved on high for 1–2 minutes. If microwaved, a microwave susceptor board will enhance crispness.

EXAMPLE 2

Batter Coating for Deep Fried Products Using KELCOGEL Gellan Gum

Gellan gum, being a good film former, is an ingredient tailored for fried foods. Incorporation of KELCOGEL gellan gum in this batter allows it to be used to coat a variety of food products such as chicken, fish, cheese, vegetables, or any other deep fried item. A crisper product with reduced oil absorption can be obtained. In frozen storage, gellan gum creates an effective moisture barrier which increases shelf-life and enhances product quality upon reconstitution in an oven or microwave.

| INGREDIIENTS | GRAMS | PERCENT |
| --- | --- | --- |
| Water | 330.00 | 66.00 |
| Wheat flour | 95.75 | 19.15 |
| Corn flour | 34.55 | 6.91 |
| Dextrose | 16.50 | 3.30 |
| Milk solids, nonfat | 8.25 | 1.65 |
| Salt | 8.25 | 1.65 |
| Sodium acid pyrophosphate | 2.00 | 0.40 |
| Sodium bicarbonate | 2.00 | 0.40 |
| KELCOGEL gellan gum | 1.20 | 0.24 |
| Calcium chloride dehydrate, fine granular | 1.00 | 0.20 |
| Sodium citrate dehydrate, fine granular | 0.50 | 0.10 |
| (H & R) | 500.00 g | 100.00% |

Optional ingredients include high amylose starch @ 2.4%, and xanthan gum @ 0.1–0.2%.

Procedure

1. Mix all dry ingredients together thoroughly in mixing bowl.
2. Add water and mix using wire whisk for 2–3 minutes.
3. Use batter in normal manner to prepare battered and breaded products.
4. Coated products may be par-fried @ 375° F. (191° C.) before freezing, or frozen raw.

EXAMPLE 3

Japanese Style Bread Crumbs for Deep-Fat Frying Using KELCOGEL Gellan Gum

KELCOGEL gellan gum, formulated directly into the dough mix, provides bread crumbs with reduced oil pick-up. Gellan gum also adds more structure to the dough during the baking process and yields a moist, dense loaf after baking.

| INGREDIENTS | GRAMS | PERCENT |
| --- | --- | --- |
| Wheat flour | 288.80 | 57.76 |
| Water | 171.60 | 34.32 |
| Dextrose | 28.90 | 5.78 |
| Salt | 5.65 | 1.13 |
| Yeast | 3.95 | 0.79 |
| KELCOGEL gellan gum | 0.70 | 0.14 |
| Sodium citrate dehydrate, fine granular | 0.40 | 0.08 |
| (H & R) | 500.00 g | 100.00% |

Procedure

1. Mix together dry ingredients except yeast.
2. Separately add 50.0 ml warm water to yeast and disperse.
3. Add remaining warm water to other dry ingredients.
4. Add yeast mixture and mix 6–8 minutes using HOBART mixer with dough hook.
5. Proof dough in pan covered with moist cloth for 15–20 minutes @ 130° F. (54° C.).
6. Bake @ 375° F. (191° C.) for 30 minutes.
7. Cool and slice.
8. Stale crumb in oven for 1 hour @ 130° F. (54° C.).
9. Grind into appropriate sized crumbs, preferably #8 mesh and use to make breaded products for frying.

EXAMPLE 4

Coated Bread Crumbs Using KELCOGEL Gellan Gum

KELCOGEL gellan gum solutions can be sprayed directly onto bread crumbs and dried to produce a free-flowing crumb. These crumbs enhance crispness and reduce oil absorption of fried foods.

| INGREDIENTS | GRAMS | PERCENT |
| --- | --- | --- |
| Water | 495.50–494.25 | 99.10–98.85 |
| KELCOGEL gellan gum | 2.50–3.75 | 0.50–0.75 |
| Calcium chloride dehydrate, fine granular | 1.50 | 0.30 |
| Sodium citrate dehydrate, fine granular (H & R) | 0.50 | 0.10 |
| | 500.00 g | 100.00% |

Bread crumbs for coating—may be any style, preferably #8 mesh size.

Procedure

1. Blend KELCOGEL and sodium citrate and add to water while stirring.
2. Heat to boiling continuing to stir.
3. Add calcium chloride to the hot solution while stirring.
4. Spray hot solution onto bread crumbs until about 0.2 to 0.49% by weight of gellan gum is on the crumb.
5. Dry coated crumb in a convection-type oven or fluidized bed drier.
6. Continue drying until a free-flowing crumb is obtained.

EXAMPLE 5

Ovenable Batter Using KELCOGEL Gellan Gum

This batter is designed for products which are baked instead of fried. It may be used on chicken, fish, cheese, vegetables and any other battered and breaded item. During the baking process gellan gum forms a film which gives the appearance of a fried product.

| INGREDIENTS | GRAMS | PERCENT |
|---|---|---|
| Water | 413.60 g | 82.72% |
| Wheat flour | 25.00 | 5.00% |
| Dextrose | 20.00 g | 4.00% |
| Nfilk solids, nonfat | 13.00 g | 2.60% |
| Salt | 10.00 g | 2.00% |
| Corn flour | 10.00 g | 2.00% |
| Starch, modified to LO-TEMP 452 (Staley) | 5.00 g | 1.00% |
| KELTROL F xanthan gum | 1.50 g | 0.30% |
| KELCOGEL gellan gum | 1.00 g | 0.20% |
| Sodium citrate | 0.50 g | 0.10% |
| Caramel color RT175 (Sethness) | 0.40 g | 0.08% |
| TOTAL | 500.00 g | 100.00% |

Optional ingredients include the use of bread crumbs, such as predusts or coarse type crumbs, preferably #8 mesh.

Procedure

1. Mix all dry ingredients together thoroughly in a mixing bowl.
2. Add water and mix for 2-3 minutes using wire whisk.
3. Use batter as in normal mariner to prepare battered and breaded products.
4. Bake coated products in oven @ 375° F. for 7-10 minutes or until done.

Note: Baking times will vary depending on the type of product being coated (i.e. chicken, fish, cheese etc.), and type of oven used.

What is claimed is:

1. A process for preparing a low-fat fried food comprising:
   a) mixing water, flour, dextrose, non fat milk solids, sodium salt, calcium salt, and gellan gum to form a gellan gum batter;
   b) coating a food substrate with the gellan gum batter;
   c) frying or partially frying the coated food substrate;
   d) freezing the product of (c); and
   e) cooking the frozen product.
2. A process of claim 1 wherein the amount of gellan gum in the batter is between about 0.05 and 1.0%
3. A process of claim 1, wherein the coated food is breaded prior to frying.

* * * * *